Sept. 18, 1962 V. W. SHANKLAND 3,054,151
TIE-DOWN DEVICES
Filed June 14, 1961
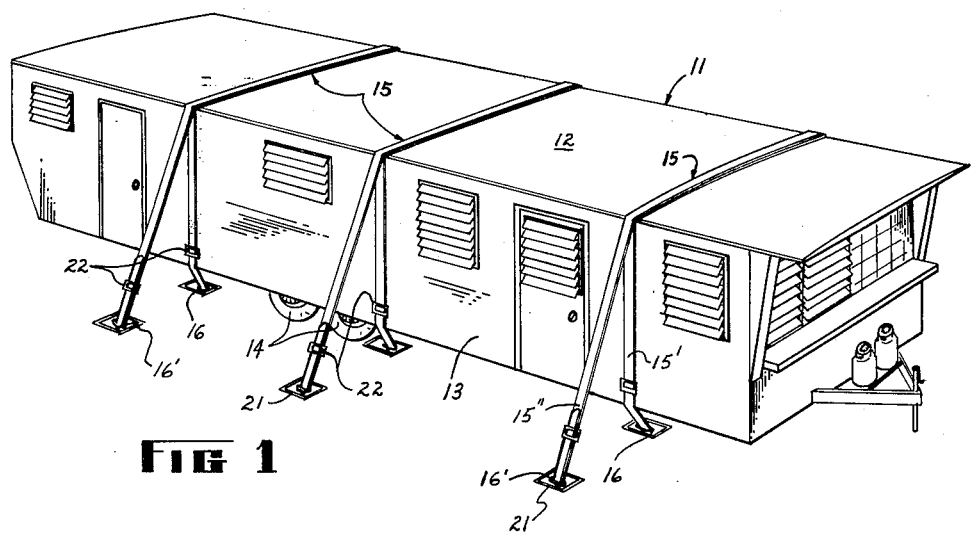
FIG 1
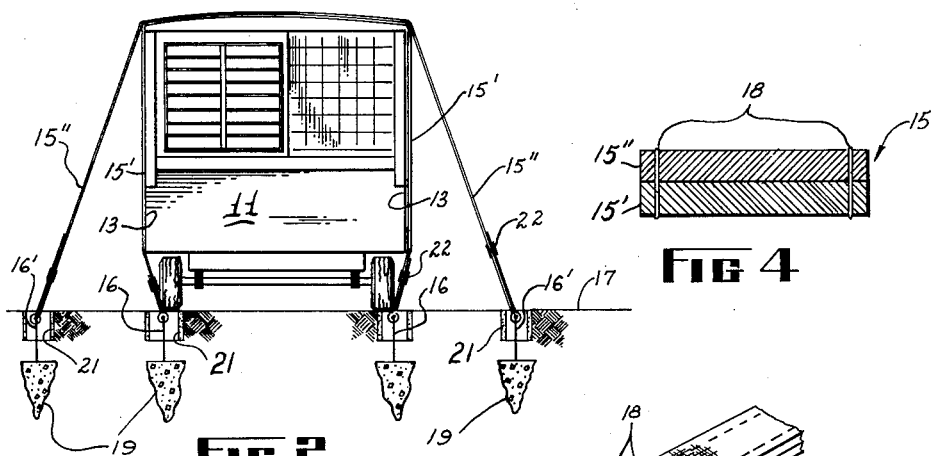
FIG 2
FIG 4
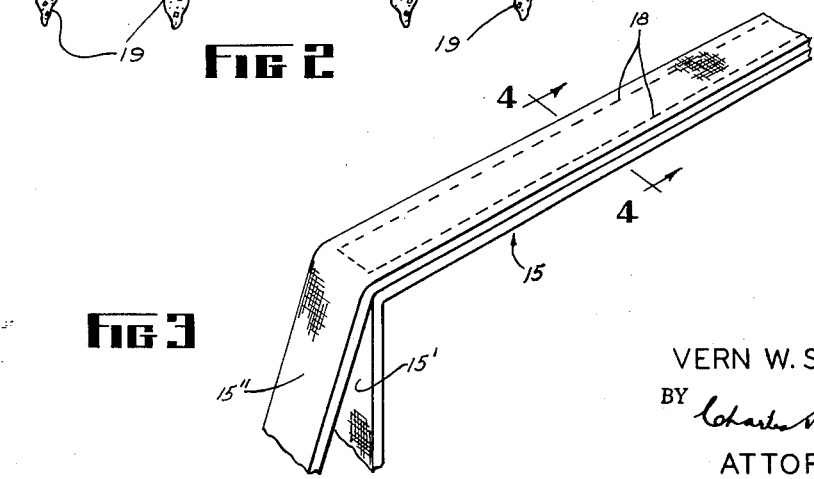
FIG 3
INVENTOR.
VERN W. SHANKLAND
BY
ATTORNEY

United States Patent Office 3,054,151
Patented Sept. 18, 1962

3,054,151
TIE-DOWN DEVICES
Vern W. Shankland, 2 E. Wilson St., Batavia, Ill.
Filed June 14, 1961, Ser. No. 117,004
1 Claim. (Cl. 20—1)

The present invention relates to improvements in tie-down devices and is particularly concerned with the novel construction and arrangement of means for lashing a house trailer or other vehicle such as a truck, boat, airplane and the like, in a secure manner to prevent it from being rocked, moved or otherwise disturbed when subjected to winds of high velocity.

Heretofore, various devices have been used to lash or otherwise secure such vehicles in place but in all known instances the arrangement and means utilized fail to afford securement against rocking and, further, frequently employ anchoring devices that are a hazard to persons walking in the vicinity of the vehicle.

The structure herein disclosed in an exemplary form is such that adequate reinforcement is provided to resist bodily displacement and it includes an arrangement that effectively prevents tilting or rocking of the vehicle when subjected to high winds directed against its side walls. The structure also includes novel attaching means for the lashing which is arranged below the surface of the ground so as not to present a hazard when the lashing is disconnected therefrom.

It is, therefore, an object of the invention to provide novel anchoring and lashing means for a trailer and the like which is adapted to be applied easily and quickly.

Another object is to provide novel anchoring means for lashing, which means is so positioned with respect to the vehicle to be lashed as to effectively prevent said vehicle from rocking or tilting when subjected to winds of high velocity applied to the side wall thereof.

Another object is to provide novel anchor devices for the lashing, which devices are arranged below the surface supporting the vehicle to be lashed.

Another object is to provide lashing means of the character disclosed herein which is comparatively simple and inexpensive to construct, strong, durable, highly efficient in use, and which may be compactly stored when not in use.

With the foregoing and such other objects in view, which will appear as the description proceeds, the invention consists of certain novel features of construction, arrangement and combination of parts hereinafter fully described, illustrated in the accompanying drawings, and particularly pointed out in the appended claim, it being understood that various changes in form, proportion, size and minor details of the structure may be made without departing from the spirit of the invention.

Referring to the drawings in which the same characters of reference are employed to identify corresponding parts:

FIG. 1 is a perspective view of an exemplary type of house trailer, showing lashing embodying the features of the invention;

FIG. 2 is an end elevational view of the trailer and lashing, illustrating the structure of the anchoring devices;

FIG. 3 is a perspective view, on an enlarged scale, of a fragmentary portion of the lashing; and, FIG. 4 is an enlarged detail sectional view taken on line 4—4 of FIG. 3.

Referring now to the disclosure in the drawings, the numeral 11 illustrates a representative form of house trailer including a roof 12, side walls 13 and supporting wheels 14. Vehicles of this character are subjected to being rocked or tilted when struck broadside by winds of high velocity. In order to prevent such tilting or rocking, the trailer is securely lashed to the ground as by means of a plurality of lashings 15 which bridge the roof from side to side and have diverging strap portions that extend in a downward direction and are secured at their ends to suitable anchors 16—16′ that are embedded below the supporting surface or ground level 17.

As is perhaps best shown in FIGS. 3 and 4, each lashing 15 is comprised of a pair of straps 15′ and 15″ that overlie one another in their central area corresponding substantially to the width of trailer roof 12 and which are secured one to the other in said area by any suitable means, such as by means of rows of stitches 18. Such stitching or other means for securement prevents relative shifting of the joined strap portions and reinforces same in the areas of greatest longitudinal stress. The free ends of strap 15′ are carried downwardly over and against the trailer side walls 13 and are threaded through apertured anchors 16, the posts of which preferably are embedded in concrete blocks 19. As shown, the anchors 16 are positioned inwardly of side walls 13 so that the ends of straps 15′ are carried inwardly around the bottom edges of said side walls. This positioning affords maximum resistance to rocking or tilting.

Additional rigidity is afforded by straps 15″, the end portions of which are inclined outwardly from the trailer side walls 13 and are secured to anchors 16′ which, like anchors 16, are embedded in concrete blocks 19. Preferable suitable framing 21 may be arranged around each anchor 16—16′ to facilitate easy access thereto for engaging the straps therewith. Any suitable fastening devices, such as loop buckles 22, may be carried on the end portions of straps 15′ and 15″, for securing them taut.

As many possible embodiments may be made in the invention, and as many changes might be made in the embodiments above set forth, it is to be understood that all matters hereinbefore set forth, or shown in the accompanying drawings are to be interpreted as illustrative and not in a limiting sense.

What I claim and desire to secure by Letters Patent of the United States is:

Means for anchoring a house trailer having its bottom supported at an elevation above the supporting ground surface comprising, at least one strap-like element extending transversely thereof across the top of said trailer and having end portions extending in a downwardly direction along the trailer side walls, said strap-like element consisting of a pair of straps one overlying the other and secured together by rows of stitches for a distance corresponding substantially to the width of the trailer, and two pairs of anchoring devices embedded below the supporting ground surface, one pair on each side of the trailer and one of each pair inwardly of the vertical plane of the related trailer side wall, the downwardly extending free end portions of said straps being secured one to each anchoring device in such manner that the strap portions secured to the inwardly located anchoring devices embrace the trailer side walls snugly and are drawn taut around the lower edges thereof whereas the other strap portions are inclined outwardly away from said side walls.

References Cited in the file of this patent

UNITED STATES PATENTS

| 777,441 | Small | Dec. 13, 1904 |
| 2,353,017 | Denton | July 4, 1944 |

FOREIGN PATENTS

| 20,249 | Great Britain | 1909 |